United States Patent [19]

Wilson

[11] Patent Number: 4,674,476

[45] Date of Patent: Jun. 23, 1987

[54] SOLAR HEATING AND COOLING APPARATUS

[76] Inventor: Neill R. Wilson, P.O. Box 538, Berryville, Va. 22611

[21] Appl. No.: 557,414

[22] Filed: Nov. 30, 1983

Related U.S. Application Data

[63] Continuation of Ser. No. 581,134, May 27, 1975, abandoned.

[51] Int. Cl.$^4$ ............................................. F24J 2/24
[52] U.S. Cl. ................................... 126/434; 126/435; 126/436; 126/452; 165/45
[58] Field of Search ................... 126/433–437, 126/452; 62/235.1, 260; 165/45 X

[56] References Cited

U.S. PATENT DOCUMENTS

| | | | |
|---|---|---|---|
| 1,425,174 | 8/1922 | Cartter et al. | 126/271 |
| 1,571,100 | 1/1926 | Skinner | 62/260 X |
| 1,703,392 | 2/1929 | Elliott | 62/260 X |
| 2,064,345 | 12/1936 | Hodgson | 126/434 |
| 2,202,756 | 5/1940 | Cline | 126/434 X |
| 2,213,894 | 9/1940 | Barry | 126/419 |
| 2,396,338 | 3/1946 | Newton | 126/271 X |
| 2,490,659 | 12/1949 | Snyder | 126/271 X |
| 2,529,154 | 11/1950 | Hammond et al. | 62/2 X |
| 2,749,724 | 6/1956 | Borgerd et al. | 165/45 X |
| 2,793,509 | 5/1957 | Keen | 62/260 |
| 3,563,305 | 2/1971 | Hay | 126/434 X |
| 3,812,903 | 5/1974 | Thomason | 126/400 X |
| 3,908,753 | 9/1975 | Balch | 165/45 X |
| 3,919,998 | 11/1975 | Parker | 126/271 X |
| 3,964,678 | 6/1976 | L'Hanlon | 126/270 X |

FOREIGN PATENT DOCUMENTS 529163 7/1920 France .
1069317 7/1954 France .

Primary Examiner—William E. Tapolcai
Attorney, Agent, or Firm—Fay, Sharpe, Beall, Fagan, Minnich & McKee

[57] ABSTRACT

Solar heating and cooling system comprising an insulated fluid containing tank positioned with a portion thereof disposed above and below ground level. The system includes apparatus for transferring heat between the tank and the atmosphere, and to or from the subterranean earth in close proximity of the tank. Baffle means located within the tank are specially arranged to cause fluid contained therewithin to be circulated in a manner whereby heat absorbed by either of the above means is dissipated into the tank fluid. Means may also be provided for directing the flow of the fluid to and from the tank to an outside heat exchanger for heating or cooling a building so that when the temperature within the tank reaches a predetermined value relative to the temperature of the inside of the building, the flow is directed in a manner to accomplish either heating or cooling as may be desired in accordance with the season of the year. Energy may be transferred from the outside heat exchanger to or from the interior of the building by means of a heat pump type reversible refrigeration system.

31 Claims, 5 Drawing Figures

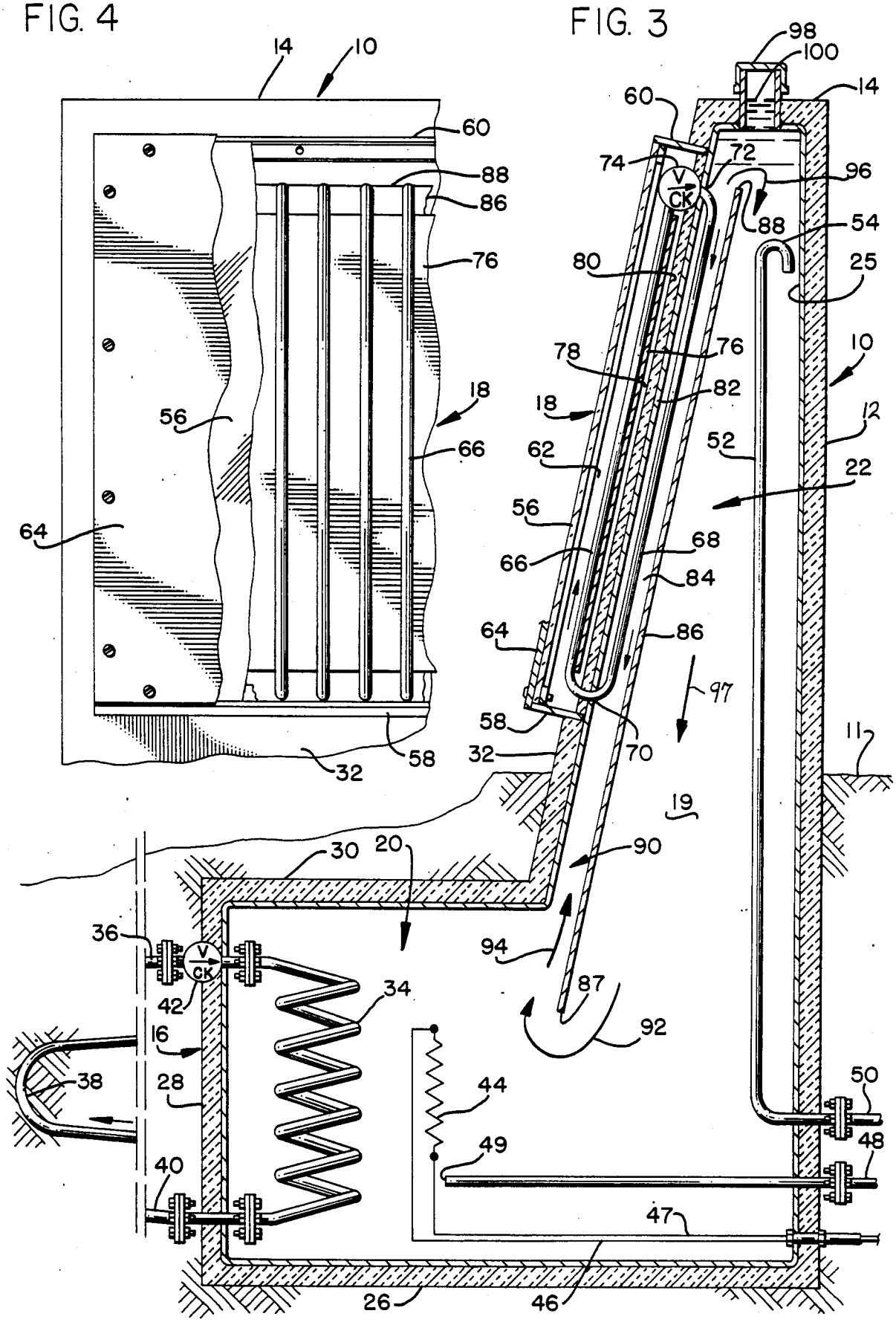

SOLAR HEATING AND COOLING APPARATUS

This application is a continuation of application Ser. No. 581,134, filed May 27, 1975, now abandoned.

BACKGROUND OF THE INVENTION

In many regions of the world, there is a need for heating in the winter and cooling in the summer, and a vast amount of energy is consumed during both seasons for these purposes. Nature abounds with many different forms of useful energy which are ignored by man, but which could be taken advantage of during both the warm and cold seasons to aid with both heating or cooling of an environment. This advantage can be realized quite economically by the provision of a system made in accordance with the present invention which can be conveniently installed adjacent to or forming part of a structure such as a home, garage, fence, or the like.

Furthermore, the present invention can be fabricated into a packaged unit which can be trucked to the installation site where it can be readily installed without destruction or modification of existing structure.

Broadly, the preferred embodiments of the present invention comprises an insulated fluid containing vessel that extends above and below the ground level with components thereof extending from the underground portion of the vessel to provide a closed looped fluid conveying system disposed in a manner such that natural circulation is effected as heat is transferred into the fluid contained within the vessel. One wall of the above ground portion of the vessel is built in the form of a solar heat collecting unit which also employs a closed loop heat collecting and dissipating system connected in heat transfer relationship to the vessel fluid in such a manner that both the system and the tank liquid are self-circulating, thereby causing heat from the solar collection surface as well as possibly from the subterranean earth to be transferred into the fluid contained within the vessel.

The fluid contained within the vessel is self-circulating and this is accomplished by allowing the cooler fluid to flow downwardly and the warmed or warmer fluid to flow upwardly as it is heated.

It is known that the subterranean temperature in the area of four to six feet below ground level remains around 52° to 57° Fahrenheit for most geographical locations in the United States. Accordingly, the underground closed loop system will impart self-circulating action into the tank when the temperature of the fluid within the vessel falls below or above the subterranean temperature.

The present invention is advantageously used in combination with a heat pump type heating and cooling system where the evaporator collects heat from the fluid which is then pumped to the condenser of the heat pump.

SUMMARY OF THE INVENTION

This invention relates to a solar type heating and cooling apparatus and specifically to heat collecting apparatus comprising an upstanding tank or vessel having a lower portion thereof located below ground level and an upper portion thereof located above ground level. In the preferred embodiment of the invention, an above ground wall structure is made in the form of a solar heat collector and dissipator, and comprises a generally vertically disposed liquid filled closed loop, or series of loops, of connected marginal lengths of conduit located within and without the vessel so that the solar heat collector transfers heat energy from the sun into the fluid contained within the tank. Baffle means are provided within the vessel and causes fluid within the tank to assume a definite circulation pattern as heat is imparted thereinto, so that relatively hot fluid migrates to the top of the vessel while relatively cool fluid migrates to the bottom thereof.

A second heat collecting and dissipating closed loop conduit has a marginal length thereof disposed within and without an underground wall member or structure of the vessel so that heat transfer is effected between the fluid contained within the vessel and the surrounding subterranean area.

Accordingly, when the fluid within the vessel falls below the temperature of the surrounding underground area, natural circulation is effected respective to the fluid contained within the vessel; and, when solar heat is available, the solar collector system transfers heat from the collection surface into the fluid contained within the tank, and as heat is transferred thereinto a natural circulation is established.

Fluid conduits may be employed to conduct the heated fluid from the tank or vessel to a heat exchanger located remote from the vessel. The heat exchanger can take on several different forms and can be in the form of a radiator for directly heating a home, or it may exchange heat to the evaporator of a heat pump, or from the condenser of a heat pump, as may be desired according to the various embodiments of the invention.

Accordingly, a primary object of the present invention is the provision of a combination heat collecting and dissipating apparatus which utilizes both solar and subterranean heat sources.

Another object of the invention is to provide apparatus for heating and cooling which employs a closed looped system for imparting natural circulation into a fluid contained within a tank.

A still further object of this invention is to provide a solar and subterranean heat collector which absorbs solar energy in the day and subterranean energy at other times if the temperature of the fluid within the storage tank is lower than that of the subterranean earth.

Another and still further object of this invention is to provide a combination solar and subterranean heat collecting system having fluid conducting closed loop piping systems arranged respective to a fluid containing vessel and having check valves in said systems and a baffle in said vessel so that natural circulation of the fluid in the closed loop systems causes heated fluid to rise in said vessel and thereby keeps the fluid in the vessel aggitated to prevent stagnation spots or layers.

A still further object of this invention is to provide a generally large flat insulated vessel that is built into a wall or roof of a building and wherein a portion thereof may extend below the ground level. The outside wall of the unit is built in the form of a solar or atmospheric heat collecting and dissipation unit wherein a closed loop or a plurality of closed loop heat collecting and dissipating conduits are connected in heat transfer relationship to the atmosphere on the outside and to the fluid on the inside of the unit, and wherein an area of the wall of said vessel on the inside of the building is uninsulated and is provided with a surface to promote radiant energy directly into the interior in the event heating is desired, or receive radiation from the building interior in the event cooling is desired. The degree of radiation heat transferred in either direction being regulated by a set of louvers which may be controlled by a thermostat, for example.

In the event the unit is built so that it is adjacent to or below ground level then the subterranean heat collecting or dissipating system as used before can be combined with the solar or atmospheric collecting or dissipating systems.

Another embodiment of the invention is the provision of a heat pump combined with a system of the invention to utilize the system completely and allow it to cool when the storage fluid temperature rises too high for direct cooling and to heat when the storage temperature gets too low for direct heating. In some areas this system is capable of providing all of the heating and cooling functions directly without the need of the heat pump. Such an integral wall or roof unit as contemplated by the invention is built directly into a home during construction thereof with a design adapted to such a fluid containing wall section or panel rather than being of utility on existing building structures.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 3 is an englarged cross-sectional view disclosing apparatus made in accordance with the present invention;

FIG. 4 is a fragmentary front elevational view disclosing a portion of the apparatus seen in FIG. 3; and, FIG. 5 is a fragmentary, part cross-sectional side view of another embodiment of the invention.

DETAILED DESCRIPTION OF THE PREFERRED EMBODIMENTS

Figure 1:
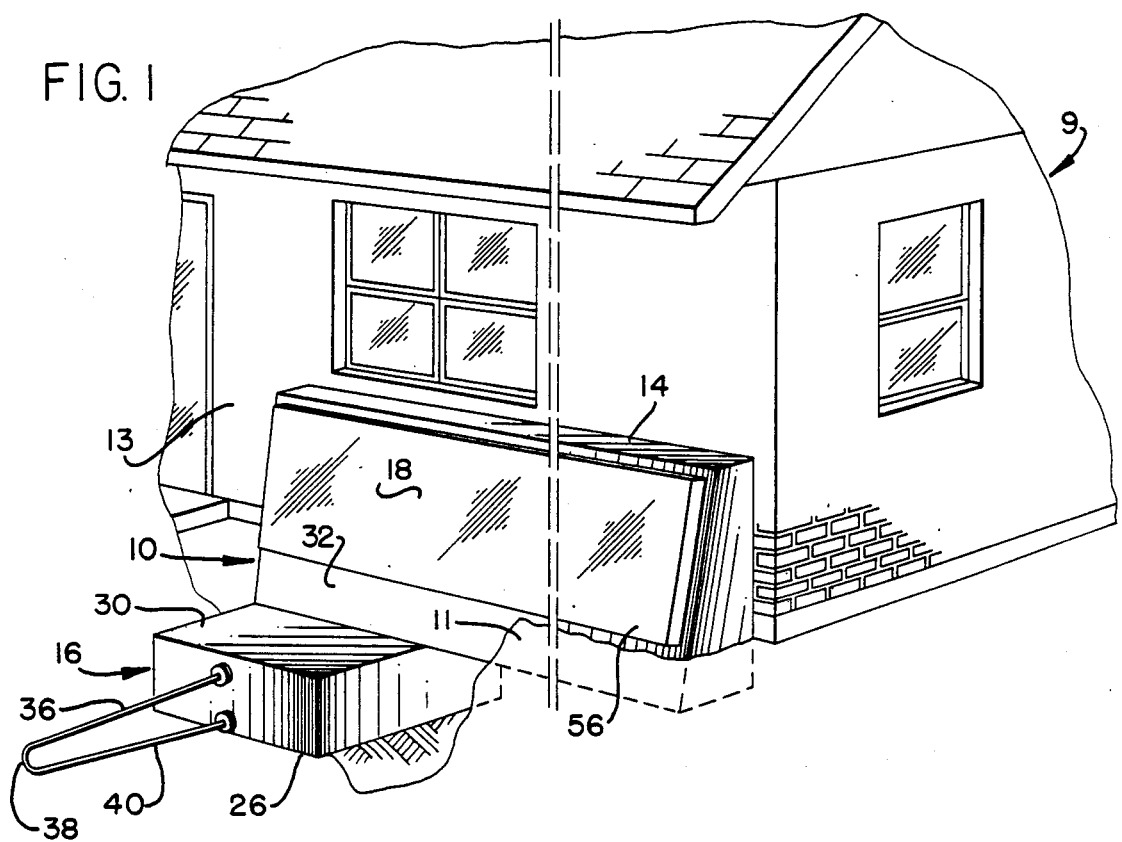
FIG. 1 is a perspective view of a building having apparatus made in accordance with the present invention associated therewith.

Through the various figures of the drawing, wherever it is possible or logical to do so, an effort has been made to cause like or similar numerals to refer to like or similar elements or objects.

In the several different Figures of the drawings, there is disclosed a building structure which forms an enclosure 9, such as a house, for example. One form of the invention is broadly indicated by the arrow at numeral 10, and is disclosed herein as being located adjacent to and perhaps forming part of one of the walls of the house.

A portion of the apparatus of the invention is seen to extend above the ground level 11 while another portion extends therebelow. The apparatus of the invention includes an insulated fluid containing vessel, or tank, which is defined by the illustrated walls. As best seen in FIG. 3 together with other figures of the drawing, a rear wall 12 spaces an upper top portion 14 from an outwardly directed lower foot portion 16. An inclined forwardly positioned wall has a solar collector assembly 18 formed therein and disposed in such a manner that solar energy can be ingested thereinto when the sun impinges thereon. The various walls of the structure define a tank having a main fluid holding chamber 19, a lower forward chamber 20, and an elevated chamber 22 each of which are in fluid flow communication with one another.

In the embodiment of FIGS. 1-4, the walls of the apparatus preferably comprises an impervious steel or metallic inner wall surrounded by foam insulation which exhibits a high K value so that indiscriminate heat transfer between the liquid contained within the vessel relative to the ambient is minimized.

A lower wall 26 bottom supports a substantial amount of the apparatus while the front wall 28 defines the extent of the forward chamber, or foot. A ledger, or horizontally directed forward wall 30, joins together the sloped wall 32 and the outer wall of the foot. A first closed loop heat exchanger 34 is illustrated as being in the form of a coil and includes a subterranean heat transfer conduit 36, 38, 40 connected to the coil 34 by means of a remote controlled check valve 42. Any number of exchanger assemblies 34 and 38 may be arranged adjacent to one another along the foot portion of the vessel, thereby increasing the working capacity of the assembly to as large a value as may be desired.

An auxiliary heater 44 is considered additive to the present embodiment and therefore forms still another embodiment of the invention, and preferably is supplied with energy by means of electrical conduits 46, 47. The auxiliary heater can instead receive a source of fluid power in the form of heated liquid, depending upon available local energy sources.

Inflow and outflow of liquid to and from the tank interior is accommodated by means of piping 48 and 50. Pipe 48 has an open terminal end portion 49 disposed in fluid communication with chamber 20, while the second tubing 50 is in the form of a riser 52 having a gooseneck 54 which forms the open terminal end thereof, with the entrance 54 being disposed at the upper extremity of chamber 22.

A transparent cover 56 isolates and insulates the solar collector from ambient conditions, with the lower and upper end portions of the collector at 58 and 60, respectively, being closed by any suitable means, thereby thermally isolating the interior 62 from convective heat transfer with the ambient. A removable cover 64 is used as a shade in order to protect and isolate the solar collector when it is desired to prevent outward radiation of energy from the system should there be occasion when there is no available solar energy.

A closed loop fluid conducting heat exchange tube 66 is more or less vertically disposed and affixed to the sloped forward wall. The tube is comprised of a liquid filled loop of series connected marginal lengths of conduit located within and without the vessel, with marginal length 66 thereof absorbing solar heat and the marginal length 68 thereof transferring the absorbed heat into the liquid contained within the vessel. U-shaped end portions or bends 70 and 72 of the loop is connected to the two marginal lengths while remote controlled check valve 74 controls the direction of fluid flow therethrough.

A black body radiation absorber in the form of a black colored backing plate 76 is attached to a rearward peripheral wall surface of the tubes 66. The plate is spaced at 78 from the insulated wall 80, with the insulation preferably being bonded to the steel wall 82. The plate and tubes are connected together to promote heat transfer therebetween and treated by using known techniques to render them anologous to a black body so far as regards the emissivity thereof.

Free area 84 is formed between the tank interior wall 82 and the baffle 86 with the baffle having opposed lower and upper terminal end portions 87 and 88, respectively. The baffle forms a tunnel or passageway 90 respective to the sloped adjacent side walls thereof so that fluid flows by natural circulation or convection in a direction as indicated by the arrows at 92, 94, 96, and 97, as heat is imparted thereinto by either of the plurality of collectors. Cap 98 enables liquid fluid level 100 to be adjusted, or the level can be maintained constant by any number of prior art expedients.

Figure 2:
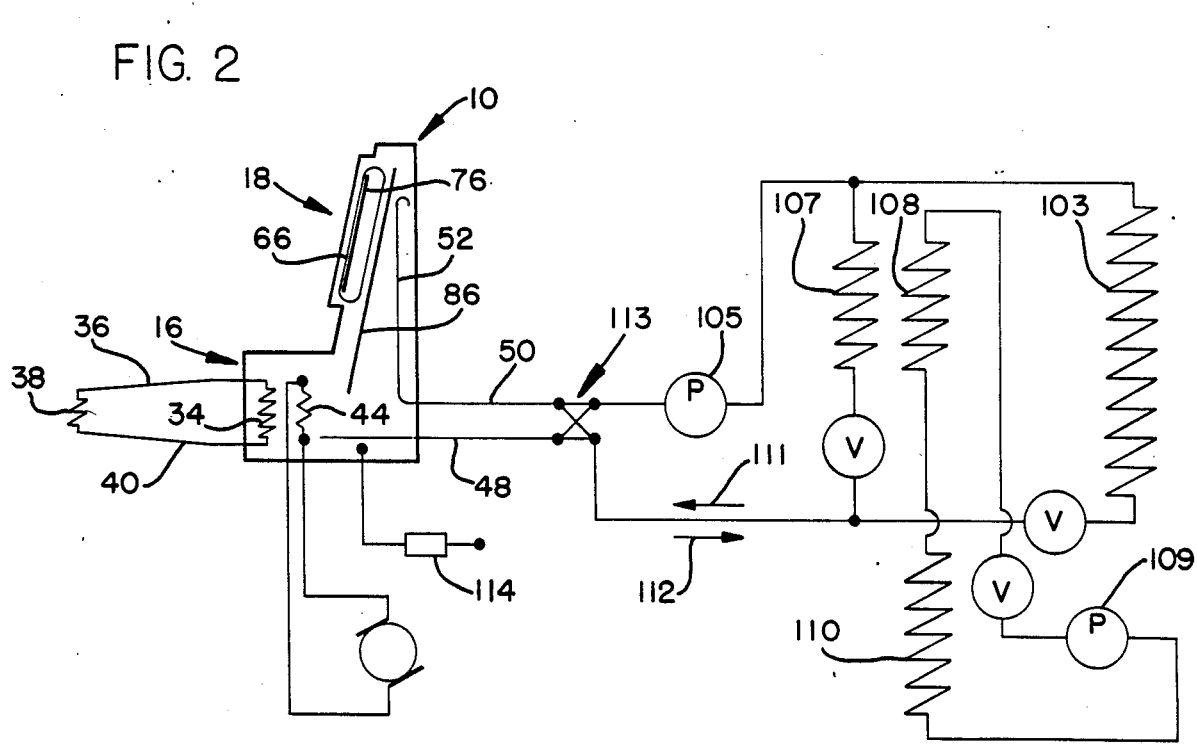
FIG. 2 is a part schematical, part diagrammatical representation of heat collecting apparatus made in accordance with the present invention.

As seen in the diagrammatical representation of FIG. 2, a heat exchanger 103 is schematically illustrated as being flow connected to a pump or compresser 105 and to the conduits 48 and 50 so that fluid is circulated through the exchanger, thereby enabling heat transfer to occur.

Heat interchangers 107 and 108 mutually exchange heat therebetween, with the fluid being circulated through the exchanger 108 by means of a circulating pump 109, and with the heat being dissipated by the heat sink or heat exchanger 110.

A cross-over or cross-feed valve 113 enables the fluid flow relationship between the exchangers and the flow conduits 48 and 50 to be reversed. A temperature control means 114 can be used to advantage in order to control the action of valves 42, 74, and 113, as well as the illustrated valves associated with fluid flow through heat exchangers 103, 107, and 108.

In operation of the embodiment disclosed in FIGS. 1-4, the cover 64 is removed from the transparent wall 56 so that solar energy impinges upon the tubes 66 and back plate 76, thereby transferring heat from the solar energy into the closed loop tube 66. As the liquid in the tube is heated, natural circulation therewithin commences in the direction indicated by the small arrows. This action transfers the absorbed solar energy into the fluid contained within the tunnel 90.

As the fluid contained within the tunnel 90 is heated, circulation within the main portion of the tank will commence in accordance with the direction of the arrows at 92, 94, and 96. Accordingly, the mean temperature of the fluid contained within the tank begins to increase with the hottest fluid being located near the upper extremity of the baffle. For this reason, gooseneck 54 is located within the upper part of chamber 22 and in close proximity of the upper extremity of the tunnel so that fluid flow can be effected between a radiator 103, for example, and the conduits 48 and 50, by means of natural circulation, or a pump, depending upon the velocity required as well as the physical elevation or relationship of the radiator to conduits 48 and 50.

In some geographical locations there is often available an intermittent source of energy, such as inexpensive electricity, especially during the nighttime. Another source of low cost enerty is obtainable from electrical storage batteries which are recharged by the wind, or alternatively, energy from water power. Such an inexpensive source of energy enables the auxiliary heater 44 ato be utilized to advantage to supplement the low cost readily available solar energy. The auxiliary heater is located in the foot portion of the tank, that is, within chamber 20, so that heat therefrom induces convection flow thereby causing liquid to flow in the before described manner.

When the subterranean temperature in proximity of the system is greater than the temperature of the liquid located within the tank, the closed loop system 34, 36, 38 and 40 can be used to advantage since natural circulation through the coil transfers heat into the liquid contained within chamber portion 20, thereby causing circulation to occur up through the tunnel as in the before described manner. The check valve 42 prevents an opposite circulation of heat transfer to occur in the event the tank liquid should rise above the ambient subterranean temperature. Where deemed desirable, solenoid actuated valves can be used in lieu of the illustrated check valves, thereby bringing any particular flow path under positive selective control.

The present invention can be used to advantage in combination with a heat pump type heating and cooling apparatus. As particularly seen in FIG. 2, exchanger 108 can be used as an evaporator disposed in heat transfer relationship relative to exchange element 107 so that a compressor located at 109 compresses a refrigerant which flows through a condensor 110, thereby giving up its heat, and expands or absorbs heat within evaporator 108. This arrangement of the system heats the interior of the house, while reversal of the relationship of the evaporator and condensor will heat the element 107, and accordingly cool the house.

Figure 5:
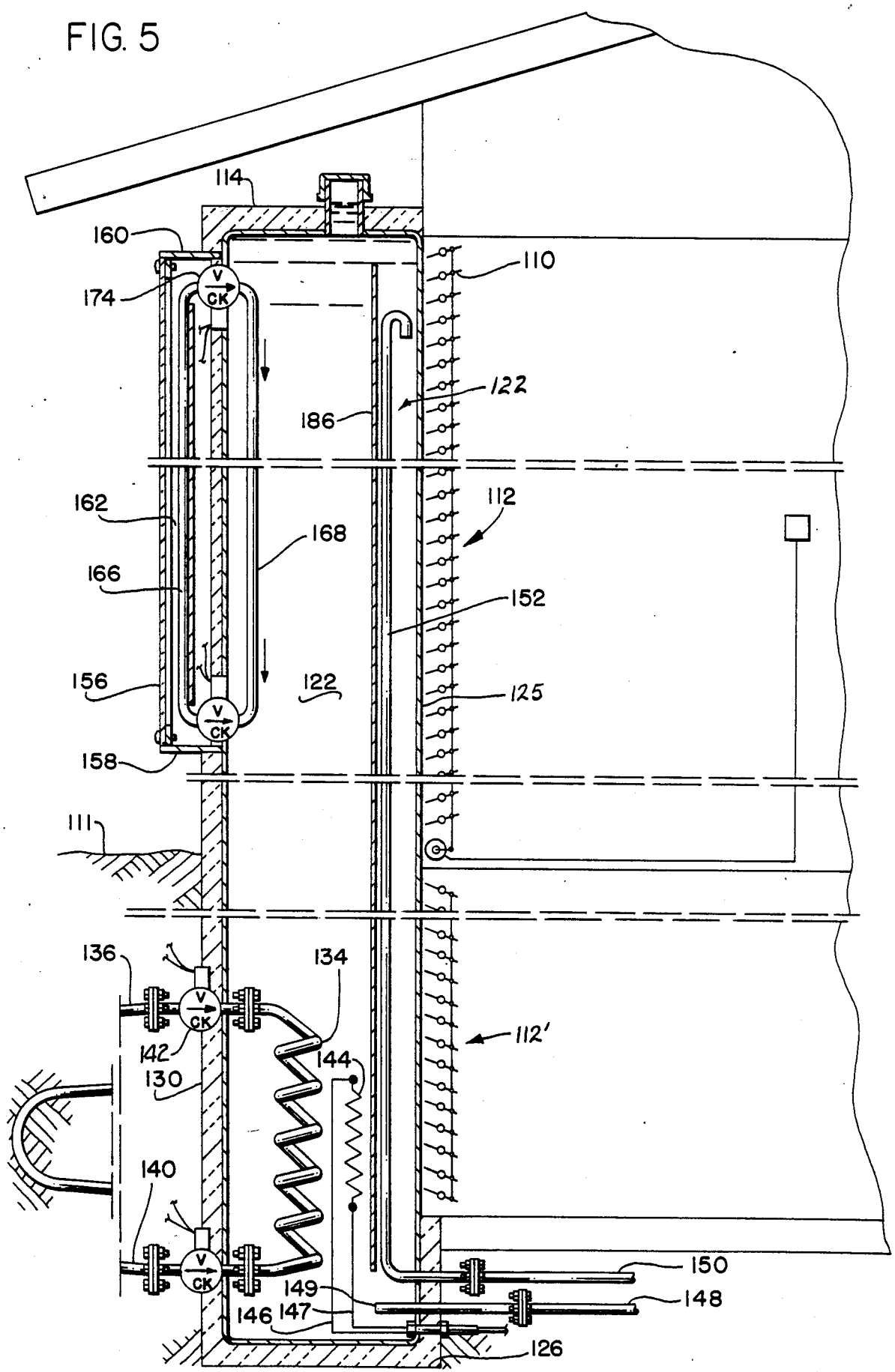

Looking now to the details of the embodiment of the invention illustrated in FIG. 5, it will be noted that the illustrated front wall houses both the solar heat collector as well as the subterreanean collector. The interior of the tank is formed into a liquid containing chamber 122 which houses the closed loop portions 134 and 168 of the solar and subterranean exchangers, and which also houses the auxiliary heater 144, baffle plate 186, upper goose neck pipe 152, and lower flow pipe 149. The baffle plate cooperates with wall 125 to form a tunnel 122 for controlling the natural circulation of tank liquid.

Shutters 110, comprised of an upper and a lower shutter assembly, may be remotely actuated to control heat transfer between the interior of the house and the illustrated heat conducting wall 125.

In operation, the embodiment of FIG. 5 provides a system for directly heating and cooling a home or building by direct radiation between the heat storage tank, or mass, and the interior of the building. The tank extends both above and below ground level and includes the illustrated two self-circulating fluid heat exchange systems, one above ground which functions as a solar heat collector for winter use and as a night time heat dissipator for summer use where the black body plate on the outside will dissipate heat from the heat storage fluid on cool nights. The below ground exchanger functions to dissipate heat during summer and preferably is sized to dissipate a great deal more heat than the upper exchanger because it operates on a full time basis, and accordingly will be rejecting the heat to the 52° to 55° subterranean earth. Moreover, the lower unit also functions during winter as a backup for the solar collector and thus never allows the holdover or storage fluid temperature to fall below the 52° to 55° range. The main distinction of this system respective to the first embodiment is that the tank is fabricated into the wall of the building and has the insulation eliminated on the inside wall surface so that heat will radiate directly to and from the tank to the interior of the house. A series of louvers 112 and 112' is provided which may be adjusted in a manner similar to a Venetian blind. The louvers are thermostatically controlled to regulate the heat radiated to or from the interior of the house. Where deemed desirable, means can be provided to regulate the flow of air over the inner wall surface to further control the room temperature. This expedient preferably is attained by attaching flat ducts to the inner surface and using a double wall on the surface, and passing air between the air space formed by the walls, thereby greatly increasing the heat transfer into or out of the mass represented by the tank.

During summer operation of this system, the holdover tank in the wall picks up radiant heat from the interior and this heat must be dissipated by the two systems. Therefore it is preferred that only counterclockwise flow takes place in each system. This expedient requires that both of the top valves 142 and 174 must be inactivated thereby leaving the bottom valves in each curcuit available to limit or control flow in a counterclockwise direction only. In winter it is preferred to pick up heat from both the solar collector and the earth, accordingly, it is therefore necessary to reactivate the top two valves and inactivate the bottom two valves, thus allowing only clockwise flow to occur around the two systems.

The baffle located on the interior of the tank will establish natural circulation in the tank during both winter and summer usage thereof.

The glass or plexiglass cover may be removed from the solar collector duing the summer season to more efficiently operate as a heat dissipator on cool nights and days.

I claim:

1. A heat system comprising:
    a fluid containing tank having adjacent portions thereof positioned above and below ground level, tank fluid contained within said tank;
    means for transferring heat from the subterranean earth adjacent to the tank to the fluid contained within the tank, the last said means including a closed loop system having a supply of loop system fluid contained therein which picks up heat from the earth and transfers the picked up heat into the tank fluid;
    means terminating the flow of said loop system fluid when the temperature within the tank becomes substantially equal to the temperature of the adjacent subterranean earth; and,
    means for adding additional heat to said tank fluid from a source other than the subterranean earth, wherein the last said means is an atmospheric heat dissipator arranged to collect solar heat during the day and dissipate heat during the night.

2. The heat system of claim 1 wherein said atmospheric heat dissipator is arranged to circulate fluid in a closed loop system which picks up heat from the sun and transfers heat into the tank fluid.

3. The heat system of claim 2 wherein means are provided for terminating the flow of the last said loop system fluid when the temperature within the tank becomes substantially equal to the temperature of the ambient.

4. Heat collecting apparatus comprising:
    an upstanding fluid containing vessel defined by spaced walls including a front wall, a top, and a bottom; a solar heat collector and dissipator affixed to one said wall with said solar heat collector being located external and said heat dissipator being located internal of said vessel;
    baffle means supported within said vessel in spaced relation to said one wall to which said collector and dissipator is affixed so that a circulation pattern is formed such that vessel fluid heated by the dissipator located within said vessel causes fluid between the baffle means and the last said wall to rise within the vessel; and,
    a closed loop system located subterraneously and having a heat absorbing and heat dissipating member located in underlying relation relative to said solar collector; and said heat absorbing member being located external and said heat dissipating member being located internal of said vessel.

5. A method of heating an enclosure comprising the steps of:
    forming a vessel containing a heat holding mass as an integral portion of one wall of the enclosure;
    insulating the exterior walls of said vessel with an insulating layer;
    securing a closed loop fluid containing heat transfer means having a plurality of heat conducting legs to one of said exterior walls of said vessel in a weight-bearing manner such that one leg of said closed loop is positioned inside said tank on one side of said one wall and in heat transfer relation to said mass and another leg of said closed loop is positioned externally of said one wall and said insulating layer for extracting solar energy from the sun;
    providing for selective directional flow of a fluid in said heat transfer means; and,
    selectively transferring solar heat into said heat holding mass from said heat transfer means.

6. The method of claim 5 further comprising the step of controlling the degree of heat transfer between said mass and the interior of the enclosure.

7. The method of claim 5 further including the step of connecting another heat transfer means between the heat holding mass and the subterranean earth adjacent to said mass so that heat transfer between the mass and the subterranean earth can occur.

8. A heat collection and storage system comprising:
    a storage vessel in which a first body of fluid is contained;
    a solar collector which is thermally isolated against convective heat transfer with the atmosphere, said collector having a transparent first wall to allow solar radiation into said collector, said collector also having a solar radiation absorbing second wall spaced from said first wall;
    a collector fluid conducting path for directing a collector fluid around an endless loop from a first portion of the loop wherein said collector fluid is in heat exchange contact with said second wall of said solar collector to a second portion of the loop wherein said collector fluid is in heat exchange contact with said first body of fluid; and,
    control means for effecting selective directional flow of said collector fluid, wherein said control means includes a pair of spaced check valves which regulate the circulation of said collector fluid when the temperature of one of said first and second loop portions is higher than the temperature of the other of said first and second loop portions.

9. The system of claim 8 wherein said solar collector is supported by structure mounted on said vessel, whereby the vessel and collector may be installed as a unit without need of providing extra structure or modifying existing structure to support said collector.

10. The system of claim 8 wherein said collector fluid conducting path is substantially vertically oriented and wherein said pair of check valves includes one located at a top portion of said endless loop and another one located at a bottom portion of said endless loop.

11. A heat collection and storage system comprising:
a storage vessel containing a first body of fluid;
a solar radiation collection member secured to said storage vessel and supported thereon;
a first closed loop conducting means containing a second body of fluid, said first loop being secured to said storage vessel and supported thereon, a fist leg of said loop being in heat exchange contact with and being positioned within said solar radiation collection member and a second leg of said loop being in heat exchange contact with said first body of fluid and being positioned in said storage vessel, wherein said first body of fluid will self-circulate when the temperature of said second body of fluid in said second leg of said loop is higher than the temperature of said first body of fluid;
insulation means disposed between said solar radiation collection member and said storage vessel for insulating said storage vessel; and,
control means for effecting selective directional flow of said second fluid.

12. The system of claim 11 further comprising a second closed loop conducting means containing a third body of fluid, a first leg of said second loop being in heat exchange contact with a subterranean earth mass and a second leg of said second loop being in heat exchange contact with said first body of fluid.

13. The system of claim 12 wherein said vessel has an upper end portion adapted to extend above the surface of the ground, said upper end portion having a wall upon which said solar radiation collection surface is mounted;
said vessel also having a lower end portion adapted to extend below the surface of the ground, said second closed loop conducting means including a dissipator which is connected in heat transfer relation to said lower end portion.

14. The system of claim 11 wherein said vessel includes a first wall within which said solar radiation collection surface is mounted, and a second wall spaced from said first wall, said second wall forming a heat exchanger means by which heat can be absorbed or dissipated from said system.

15. The system of claim 11 wherein said vessel includes an upper wall within which said solar radiation collection surface is mounted, a second wall spaced from said first wall for dissipating heat from said vessel, and further including a lower end portion where heat is transferred into said vessel from the subterranean earth.

16. Apparatus for controlling energy transmission between two closely-spaced regions in a system, that comprises: an isolating structure disposed in the space between the two closely-spaced regions, a liquid disposed within said structure and adapted to flow or move therein, control means other than the character of the liquid itself responsive to a temperature parameter of the system and using only thermal energy acting to control automatically the movement of the liquid flow in said structure, said liquid, mostly by virtue of the convective properties of the liquid, using only thermal energy and without change of state thereof, acting to modulate the energy transmission between the two closely-spaced regions of the system, said isolating structure comprising a thermal insulator interposed between the two regions and serving to divide the isolating structure into a first section adjacent the first region of the two regions and a second section adjacent the second region of the two regions, said liquid being disposed within the first section and the second section and adapted to flow by convective flow from one to the other of the two sections, the control means acting to affect said convective flow; and a heat transfer mechanism that comprises fluid means whereby a fluid is caused to flow adjacent to said second section to exchange energy with the liquid in said second section and wherein said fluid means is a gas and which includes means to force flow of the gas in thermal contact with said second section and wherein there is an intermediate wall between the isolating structure and the interior of the building, which intermediate wall serves as an energy storage medium.

17. Apparatus for controlling energy transmission between two closely-spaced regions in a system, that comprises: an isolating structure disposed in the space between the two closely-spaced regions, a liquid disposed within said structure and adapted to flow or move therein, control means other than the character of the liquid itself responsive to a temperature parameter of the system and using only thermal energy acting to control automatically the movement of the liquid flow in said structure, said liquid, mostly by virtue of the convective properties of the liquid, using only thermal energy and without change of state thereof, acting to modulate the energy transmission between the two closely-spaced regions of the system, said isolating structure comprising a thermal insulator interposed between the two regions and serving to divide the isolating structure into a first section adjacent the first region of the two regions and a second section adjacent the second region of the two regions, said liquid being disposed within the first section and the second section and adapted to flow by convective flow from one to the other of the two sections, the control means acting to affect said convective flow; and a heat transfer mechanism that comprises fluid means whereby a fluid is caused to flow adjacent to said second section to exchange energy with the liquid in said second section and wherein the isolating structure is oriented so as to have a vertical component of orientation, in which the thermal insulation is impenetrable to the liquid at all portions thereof except at its top or upper portion and at its bottom or lower portion, one of the upper portion and the lower portion being selective by virtue of said control means in permitting the liquid to pass through the particular portion when moving from one section to the other section and wherein said control means comprises liquid valve means operatively disposed to effect selective directional flow of the liquid through the upper and lower portions to permit flow of the liquid between the two sections to be in one direction in the summer and in the other direction in the winter.

18. A heat transmission module that comprises, in combination:
solar collector means containing liquid for absorbing solar radiation;
storage means for storing liquid, the storage means connected to the solar collector means though liquid flow passages to exchange liquid therebetween, the liquid flow between the solar collector means and the storage means forming a natural convection circulation loop; and insulation means for insulating and separating the collector means from the storage means and for carrying structural loads;

the storage means and the insulation means being structurally bonded to each other in load-bearing relationship, at the periphery of the module and at a mutiplicity of zones distributed throughout the area of the module within the periphery, so as to provide a unitary load-bearing structure.

19. A heat transmission module as claimed in claim 18 which includes a heat exchanger combined as part of the storage means.

20. A heat transmission module as claimed in claim 19 that includes valve means to modulate liquid flow between the solar collector and the storage means.

21. A heat transmission module as claimed in claim 18 that further includes duct means to permit air flow past the storage means to effect efficient heat transfer.

22. A heat transmission module as claimed in claim 21 that includes valve means to modulate liquid flow between the solar collector and the storage means.

23. A heat transmission module as claimed in claim 18 wherein the collector means also serves a dissipator function.

24. A heat transmission module as claimed in claim 18 that includes valve means to modulate liquid flow between the solar collector and the storage means.

25. A system comprising a plurality of modules, like the module of claim 18, connected in ganged configuration.

26. A heat transmission module as claimed in claim 18 whose storage means also performs a heat exchanger function.

27. A heat transmission module as claimed in claim 18 whose storage means also performs a duct function permitting effective air flow past the storage means to effect efficient heat transfer therebetween.

28. A heat transmission module that comprises, in combination:

solar collector means containing a liquid for absorbing solar radiation;

storage means for storing liquid, the storage means connected to the solar collector means through fluid flow passages to exchange liquid therebetween, the liquid flow between the solar collector means and the storage means forming a natural convection circulation loop;

and insulation means for insulating and separating the collector means from the storage means and for carrying structural loads;

the storage means and the insulating means being structurally bonded to each other in load-bearing relationship, at the periphery of the module and at a multiplicity of zones distributed throughout the area of the module within the periphery, so as to provide a unitary load-bearing structure; and externally powered valve means operable to modulate liquid flow between the collector means and the storage means.

29. A heat transmission module as claimed in claim 28 wherein the externally operated valve means is an electrically actuated valve or a pneumatically operated valve or a hydraulically operated valve.

30. A heat transmission module as claimed in claim 28 wherein the storage means also performs a heat exchanger function.

31. A heat transmission module as claimed in claim 30 whose storage means also performs a duct function permitting effective air flow past the storage means to effect efficient heat transfer therebetween.

* * * * *